(12) United States Patent
Wells

(10) Patent No.: US 6,194,791 B1
(45) Date of Patent: Feb. 27, 2001

(54) WAVE ENERGY CONVERTER

(75) Inventor: Alan Arthur Wells, Ely (GB)

(73) Assignee: Applied Research & Technology Ltd., Scotland (GB)

(*) Notice: Subject to any disclaimer, the term of this patent is extended or adjusted under 35 U.S.C. 154(b) by 0 days.

(21) Appl. No.: 09/202,197

(22) PCT Filed: Jun. 10, 1997

(86) PCT No.: PCT/GB97/01551

§ 371 Date: Jun. 7, 1999

§ 102(e) Date: Jun. 7, 1999

(87) PCT Pub. No.: WO97/47821

PCT Pub. Date: Dec. 18, 1997

(30) Foreign Application Priority Data

Jun. 10, 1996 (GB) .................................................. 9612087

(51) Int. Cl.[7] .......................... F03B 13/10; F03B 13/12; H02P 9/04

(52) U.S. Cl. ............................. 290/53; 290/42; 290/43; 290/54

(58) Field of Search ................................ 290/53, 54, 55, 290/42, 43

(56) References Cited

U.S. PATENT DOCUMENTS

| | | | |
|---|---|---|---|
| 4,078,871 | * 3/1978 | Perkins, Jr. ........................ | 417/100 |
| 4,341,959 | * 7/1982 | Ambli ................................. | 290/53 |
| 4,540,313 | * 9/1985 | Broome .............................. | 290/52 |
| 5,009,568 | * 4/1991 | Bell ..................................... | 290/53 |
| 5,027,000 | * 6/1991 | Chino et al. ....................... | 290/53 |

FOREIGN PATENT DOCUMENTS

| | | | |
|---|---|---|---|
| 1502652 | 3/1978 | (GB) | 290/53 |
| 1601467 | 10/1981 | (GB) | 290/53 |
| 2131886 | 7/1987 | (GB) | 290/53 |
| 2250321 | 3/1994 | (GB) | 290/53 |
| WO 87/03045 | 5/1987 | (WO) | 290/53 |

* cited by examiner

*Primary Examiner*—Elvin Enad
(74) *Attorney, Agent, or Firm*—Levisohn, Lerner, Berger & Langsam

(57) ABSTRACT

A wave collector structure (51) for electrical power generation powered by wave energy comprises an outwardly extending and downwardly depending lip (105, 107) below which is situated a mouth (61, 67) of the collector. The collector further comprises side walls (75, 79) for channelling waves into the collector mouth. These side walls (75, 79) extend horizontally substantially up to or beyond the lip, partially enclosing a volume of water between the lip and side walls. The collector is placed in its desired location by sealing the mouth (61, 67) with gates (not shown) and floating the structure to its desired location. Control valves are opened to allow water into the collector to sink the structure to the sea bed (63) whereupon the gates are removed.

16 Claims, 6 Drawing Sheets

WAVE ENERGY CONVERTER

The present invention relates to a structure for collecting waves, with the intention of transforming wave energy into electrical or another readily utilisable form of energy.

Since the 1970's there has been increasing concern about the earth's finite fossil fuel resource and about environmental pollution resulting from combustion of such fuels. This has led to considerable efforts to develop new and cost-effective means of obtaining energy from renewable sources. In particular, there has been much interest in how to derive usable energy from solar, geothermal, wind and wave sources. The latter two offer the prospect of generating electricity by directly converting the kinetic energy of wind or waves into electrical energy.

Theoretically, waves constitute an enormous reservoir of energy to be exploited. However, the random nature and the hostility of the marine environment pose significant problems to the practical realisation of a cost-effective wave-to-electricity energy converter.

Although deep water offers the largest incident power flows, it has been realised that the mass, rigidity and complex engineering necessary to enable the equipment to survive in that environment makes it uneconomic. Another reason is that deep water structures must float and this reduces the conversion efficiency.

It is now known that a depth of about 10 fathoms is about optimum. Although incident power flows reduce with decreasing depth, so do construction, installation and operating costs.

The applicants have previously filed International patent application No. PCT/GB92/00711, published as WO 92/18704. This describes a number of different configurations of deep-water wave collectors/generators.

Another proposal for a design of collector is shown in FIG. 1 of the accompanying drawings. This structure 1 comprises a collector 3 comprising a base 5, a rear wall 7, a top wall 9 and a lip 11 which depends vertically downwards from the upper wall 9. The lower edge 13 of the lip 11 protrudes below the level 15 of the incident waves 17.

In the structure shown in FIG. 1, the space below the lower edge 13 of the lip 11 defines a mouth 19 through which the water enters. The space 21 above the waves 17, within the collector 3, is extended by means of a chimney or duct 23, which under influence of the wave action, behaves as an air column of oscillating pressure to drive a self-rectifying turbine 25 connected to an electrical generator 27. The turbine 25 and generator 27 are located in the upper part 29 of the duct 23, just below an air outlet 31.

The collector 3 also comprises side walls 33 etc. (as shown in FIG. 1), parallel to the plane of the paper but respectively above and below the plane of the paper. The side walls extend to a point 35 forward of the lip 11 and up to the level 35 of the upper surface 9 of the collector. This has been found to aid efficiency of conversion of wave power to electrical energy.

Another known arrangement is shown in FIG. 2 of the accompanying drawings. This comprises a structure 41 comprising a generally scoop-shaped collector 43 with a flat upper wall 45 and a vertically downwardly depending lip 47. It can be seen that this is generally analogous to the structure shown in FIG. 1, except that the shape of the collector 43 generally resembles a "C" shape but with a flattened top and a vertically downwardly depending lip.

Whilst all of the aforementioned known proposals represent significant advances in the development of a practical wave-to-electricity energy converter, in practice it is quite difficult to design a shape of wave collector structure which is efficient in converting wave energy to electrical energy, sufficiently buoyant and stable to be floated to the off-shore site and yet which can be safely anchored to the sea bed in such a way as to be able to withstand the strongest waves which are encountered perhaps once only in fifty years.

A new form of structure has now been devised capable of fulfilling these stringent criteria. This embodies a number of inventive concepts.

Thus, a first aspect of the present invention provides a wave collector structure for an electrical power generator powered by wave energy, the structure having an outwardly extending and downwardly depending lip below which is situated a mouth of the collector, the collector further comprising a pair of side walls for channelling waves into the collector mouth, the side walls extending horizontally, substantially up to or beyond the lip for enclosing partially, a volume of water between the lip and side walls.

Thus, in the kind of structure according to the first aspect of the present invention, the two side walls define the extent of the partially enclosed volume of water in one direction. The outwardly extending and downwardly depending lip effectively defines the rear and lower extent of the partially enclosed volume. This has been found to enhance the efficiency of conversion, in comparison with the corresponding design with a vertically descending lip as shown in FIG. 1 or FIG. 2.

The lip can take on a number of configurations, for example substantially flat (but sloping) or curved, preferably with a convex curvature as viewed from the exterior of the structure.

In a preferred embodiment, the side walls respectively flank the wave collector at either side of the mouth and may be integral with the outermost edges of the mouth.

The collector may comprise a plurality of tubular collector chambers, each having an outwardly extending and downwardly depending lip part below which is situated a mouth part. The collector chambers may have a rectangular, square or circular cross-section, the mouth parts being rectangular, square or C-shaped.

This chamber profile is differentiated from that of the prior art arrangement as shown in FIGS. 1 and 2. The lip parts of the chambers extend in a forward and downward depending fashion, rather than as a vertically descending lip. This arrangement has been found to confer additional advantage in performance terms over the prior art arrangements. In practice, the collector according to the present invention will usually be flanked by a pair of side walls. The side walls also serve to enhance collection efficiency.

Preferably, as in the preferred embodiment, the side walls extend beyond the lip defined by the upper surface of the collector chambers to enclose partially, a volume of water between the lip and the side walls.

A second inventive feature provided by the present invention involves the placing in a desired location of the collector described above. Thus, a second aspect of the present invention provides a wave collector structure for an electric power generator powered by wave energy, the structure having an inlet for the ingress of waves and valve means for sealing the inlet to enable the structure to be floated to a desired location whereupon the valve means is opened to allow water to enter and allow the structure to sink.

The wave collector of the second aspect of the present invention may have any of those features described above, wherein the collector mouth would be sealed by gate means which would be removed once the structure had submerged.

The structure/collector according to the invention may be anchored by means of an elongate member extending into the sea bed from a lower part thereof.

In use, oscillations of the water surface within the collector cause corresponding pressure changes in the air above the surface, constrained within the upper part of the collector. These pressure changes can be ducted to a rotor used to drive a generator of electricity, i.e. a dynamo or alternator device. They can also be used to transmit power to the land in hydraulic form. However, it will be appreciated that in the broadest, the present invention comprises the collector or collector structure per se.

Preferably, such a rotor as referred to above is a self-rectifying turbine. This means, a rotor which turns in the same direction, regardless of which direction the air is incident thereupon. More preferably, it is a zero incidence self-rectifying turbine.

One form of self-rectifying turbine is the so-called Darius rotor. Essentially, the Darius rotor comprises a plurality of aerofoil-shaped blades, preferably of symmetric cross-section, extending longitudinally between an upper and a lower support so as to form a pseudo-spherical cage.

Another kind of self-rectifying turbine is described in UK Patent Specification GB 1 595 700. For such a turbine, one rotor is provided for each generator and is located in the collector housing for direct conversion of wave energy.

In use, a structure according to the first or second aspects of the present invention structure is anchored to the sea bed by means of ballast inside the side/end walls. Any side or end walls or scoop-shaped collector may be formed of a plurality of pipe-like members. The ballast may comprise sediments pumped from the sea bed. Alternatively, concrete is used. This has the additional advantage of strength which it confers when bonded to the steel of the structure.

The sediments surrounding or partly embedding the structure can also be used for anchoring by being treated, e.g. chemically, to at least partly stabilise them.

Only an upper region, e.g. the top surface, of such sediments may be treated or they may be treated substantially throughout.

The sediment can be pumped into the side walls and permeated with lime water and carbon dioxide so that it is stabilised. Lime water and carbon dioxide constitute a particularly preferred treatment for any application.

Other particular forms of chemical treatment are also possible. For example, the sediment may be permeated with sodium silicate and hydrochloric acid which react chemically to form silica gel. The latter in combination with the sediment then effectively form a stable base. It is also possible to permeate the sediments with an oil such as residual oil to achieve the same effect. Another treatment is to permeate the sediments with portland cement grout.

The ultimate choice of material(s) for this chemical or other treatment will ultimately depend on the logistics of supply and placement, as well as cost and environmental considerations.

Other supplementary anchoring means include placing broken rock around the outside of the structure when it is anchored in place, grouting, or providing skirts and/or mud mats extending from the structure.

Preferably, the internal datum level defining a median water level in the upper part of the collector is such that the ratio of the water inlet area at the collector mouth to the internal cross-sectional area of the collector at the internal datum level is less than 0.7.

Preferably the ratio is less than 0.6, especially less than 0.5, but preferably more than 0.4.

It is also possible for the structure to be provided with a further rotor intended to be driven by wind power, preferably positioned at or near the top of the structure. The wind-driven rotor is provided for providing an auxiliary power generator.

The present invention will now be explained in more detail by reference to the following description of a preferred embodiment and with reference to the accompanying drawings in which.

Figure 1:
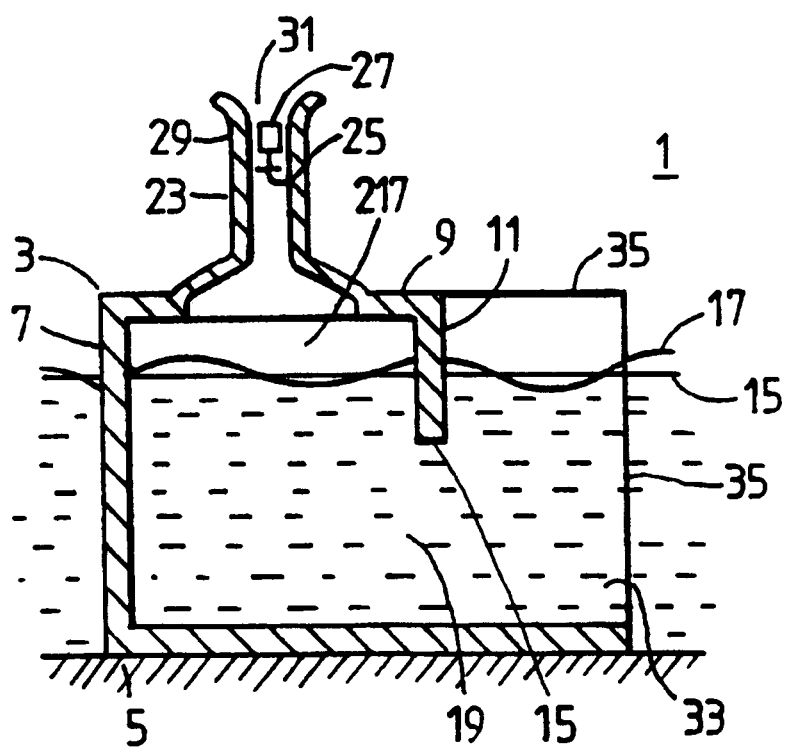
FIG. 1 shows a cross section through one known type of wave collector structure.
Figure 2:
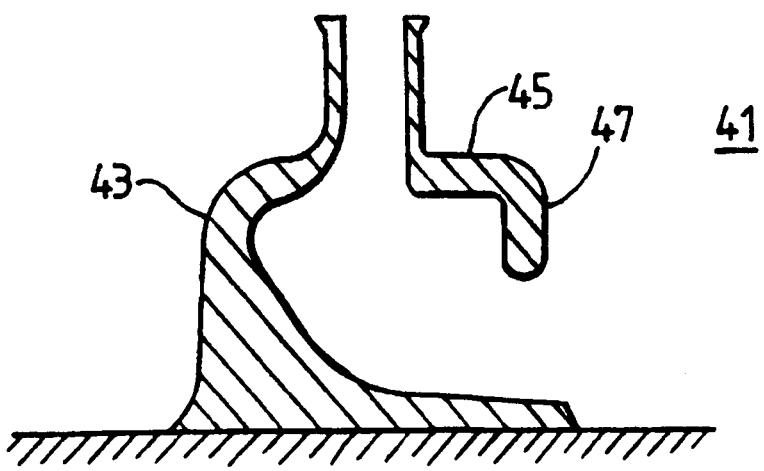
FIG. 2 shows a cross section through a second kind of known wave collector structure.
Figure 3:
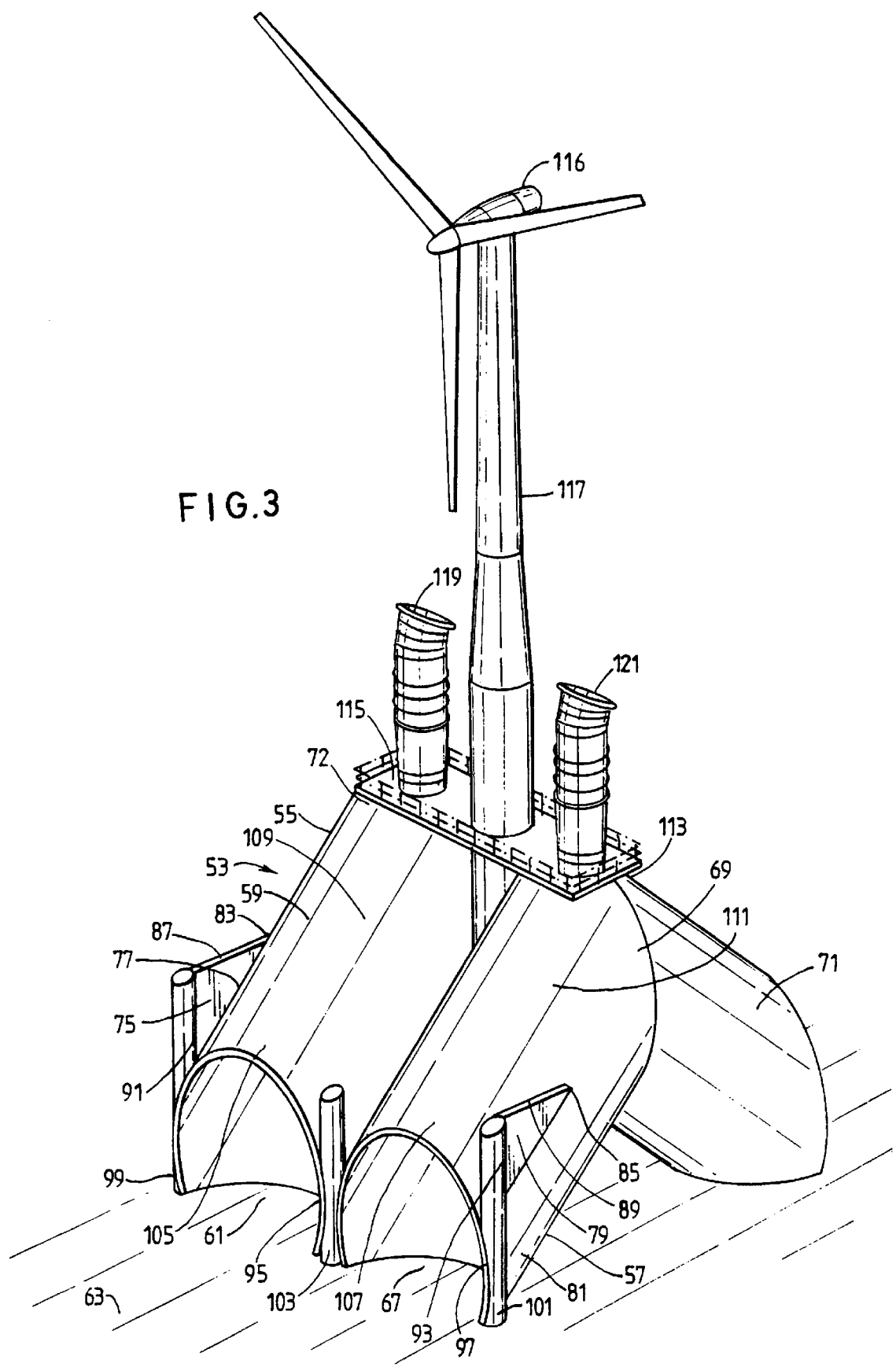
FIG. 3 shows a perspective view of a first embodiment of a wave collector structure according to the present invention.

Referring now to FIG. 3 of the drawings, there is shown a first embodiment of a wave collector structure 51 according to the present invention. This comprises a wave collector 53 which comprises a first collector chamber 55 and a second collector chamber 57. The first collector chamber 55 comprises a first tubular section 59 which extends upwardly at about 45° to the horizontal from a first open mouth part 61 where it touches the sea bed 63. The second collector chamber 57 also has a first tubular section 65 which extends upwardly at about 45° to the horizontal from a second open mouth part 67 where it touches the sea bed 63 (the two open mouth parts 61, 67 together constituting a collector mouth).

The upper end 69 of the first tubular section 65 of the second collector chamber 57 is contiguous with a second tubular section 71 which extends downwardly at about 45° to the horizontal, to the sea bed 63. The upper end 72 of the first tubular section 59 of the first collector chamber 55 is contiguous with a second tubular section of the first collector chamber 55 but this second tubular section is not visible from the perspective view shown in FIG. 3. However, it lies parallel to the second tubular section 71 of the second collector chamber 57.

The first and second collector chambers 55, 57 are interconnected internally, in the region of their uppermost parts where their respective first and second tubular sections are joined.

The wave capture area of the open mouths 61, 67 of the collector chambers 55, 57 is bound by a first side wall 75 on the outermost side 77 of the first tubular section 59 of the first collector chamber, and a second side wall 79 on the outermost side 81 of the first tubular section 65 of the second collection chamber 57.

The side walls 75, 79 extend forwardly (i.e. towards the mouths 61, 67) from a respective point 83, 85 approximately mid-way up the length of the first tubular sections 59, 65. Each side wall terminates in a respective horizontal upper edge 87, 89 and a respective vertical forward edge 91, 93. The forward edges 91, 93 are adjacent to the respective rims 95, 97 of the open mouths 61, 67. At each forward edge is provided a respective tubular strengthening support 99, 101. A third tubular strengthening support 103 is provided between the rims 95, 97 of the open mouths 61, 67. Each of these tubular strengthening supports 99, 101, 103 may house a respective anchoring bolt which extends into the sea bed 63.

Thus, in use, a volume of water is partially bounded by the lowermost (lip) regions 105, 107 of the upper surfaces 109, 111 of the first tubular sections 59, 65 and the side walls 75, 79. The side walls 75, 79 including their respective supports 103 extend horizontally forwardly (i.e. in a direction away from the upper ends 69, 72 of the first sections 59, 65 at both collection chambers) up to collector mouth parts 61, 67.

The apex 113 of the collector structure (where the first and second tubular sections meet) has an inspection platform 115 mounted thereon. A tower 117 extends from the centre of the platform 115 and a wind-powered rotor 116 is mounted for supplementary generation of electricity. However, the main rotor/generator equipment is mounted in respective hollow towers 119, 121 which are in communication with the hollow interiors of the respective first and second collector chambers 55, 57. These towers are situated either side of the wind-powered rotor tower 117 and extend upwardly from the platform 115.

Figure 4:
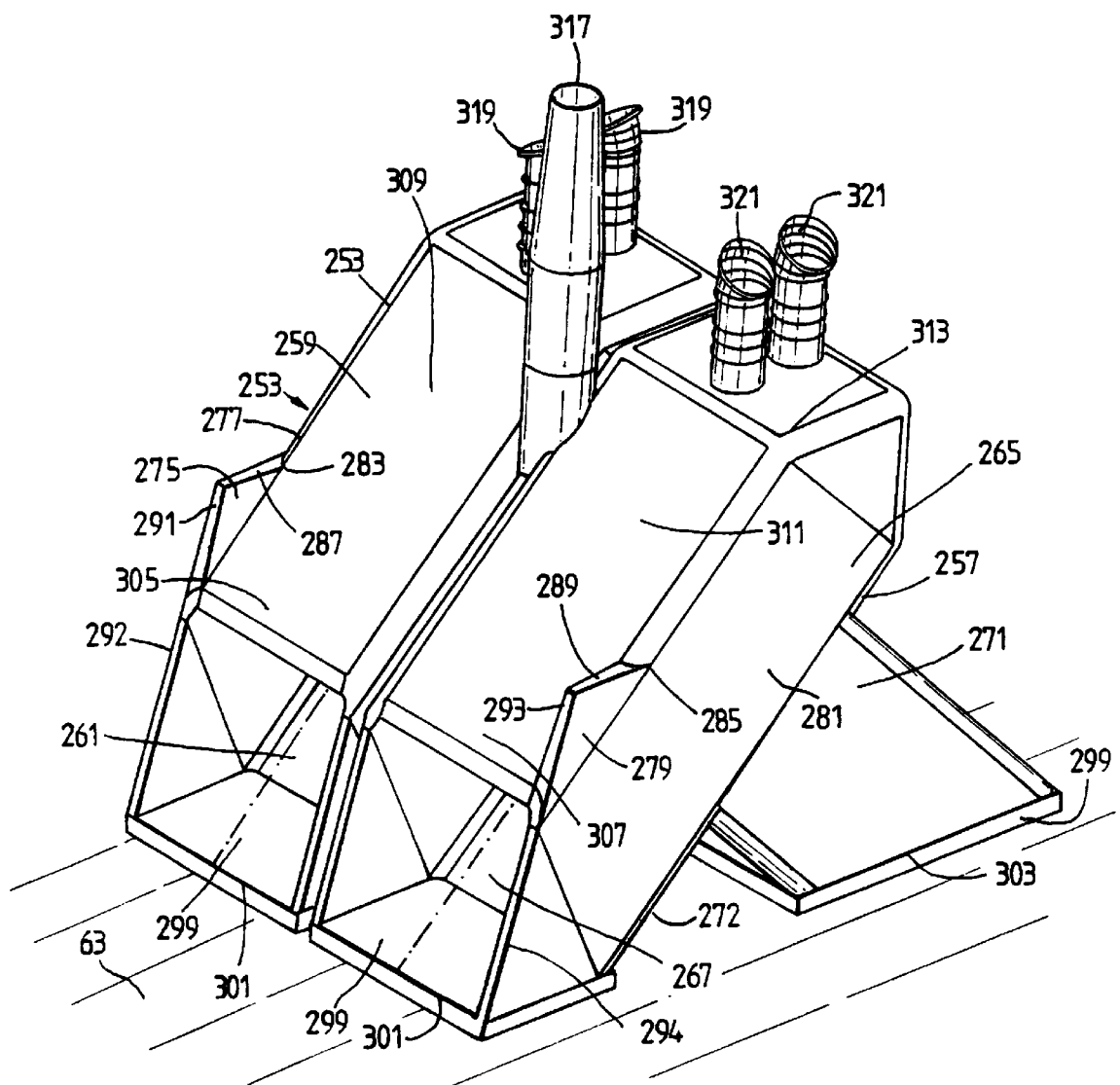
FIG. 4 shows a perspective view of a second embodiment of a wave collector structure according to the present invention.
Figure 5:
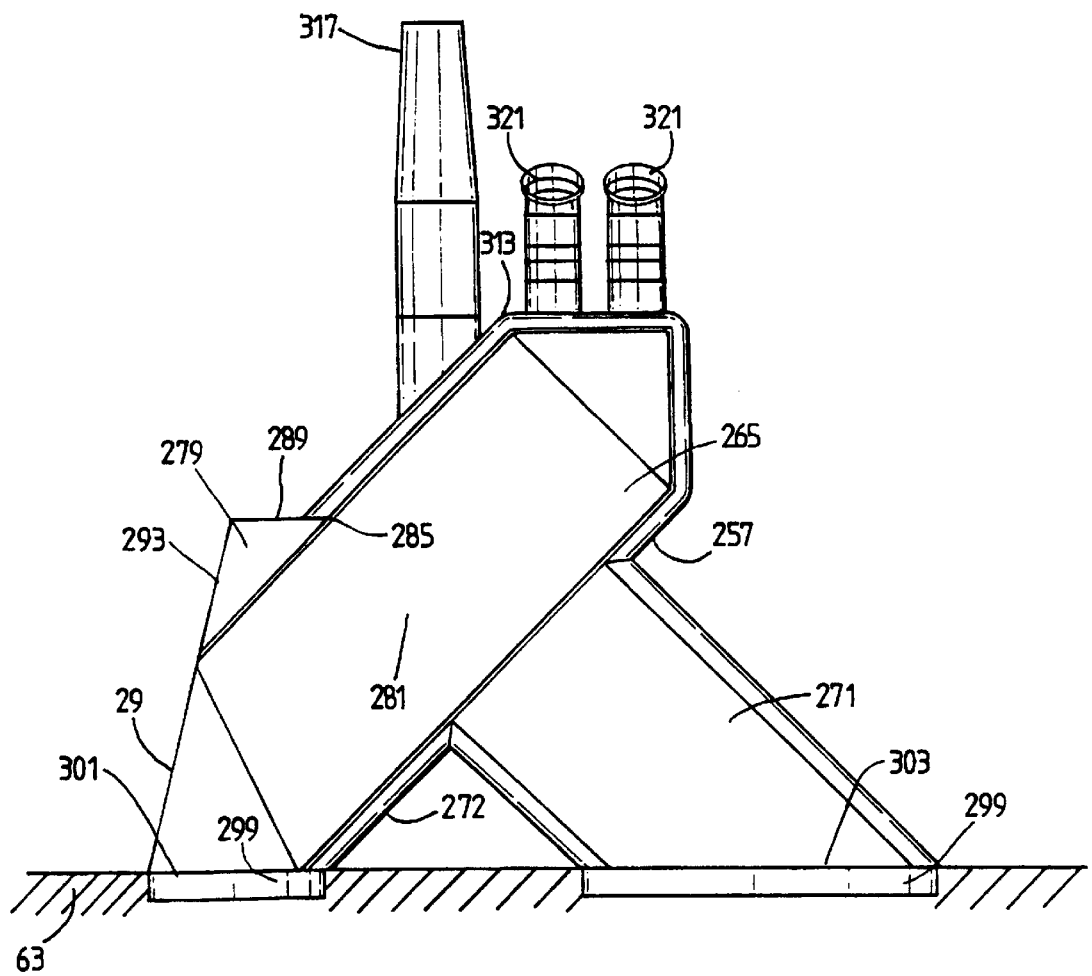
FIG. 5 shows a side view of the wave collector structure shown in FIG. 4.

A second embodiment of the present invention is shown in FIGS. 4 and 5. This shows a wave collector structure 251 which comprises a wave collector 253. The wave collector 253 is similar to that shown in FIG. 3. It comprises a first collector chamber 255 and a second collector chamber 257. The first collector chamber 255 comprises a first tubular section 259 of square cross section which extends upwardly at an angle to the horizontal from a first open mouth part 261 where it touches the sea bed 63. The second collector chamber 257 also has a first tubular section 265 of square cross section which extends upwardly at an angle to the horizontal from a second open mouth part 267 where it touches the sea bed 63 (the two open mouth parts 261, 267 together constituting a collector mouth). The tubular sections extend at an angle to the horizontal so that the ratio of the inlet area at the collector mouth to the internal cross-sectional area of the collector chambers is preferably less than 0.5, but more than 0.4. This is achieved by an angle to the horizontal of between 30° and 60°. The first tubular sections 259, 265 are arranged to be parallel to each other.

The first and second open mouth parts 261, 267 are generally square in shape with rounded corners created a slightly curved surface.

The first tubular sections 259, 265 of the first and second collector chambers 251, 257 are supported by second tubular sections which extend downwardly at a similar angle to the horizontal of the upwardly extending first tubular sections 259, 265, to the sea bed 63 from a respective point approximately midway up the length of the lower edge 272 of the first tubular sections 259, 261. The second tubular section of the first collector chamber 255 is not visible from the perspective view shown in FIG. 4. However, it lies parallel to the second tubular section 271 of the second collector chamber 257

The first and second collector chambers 255, 257 may be interconnected internally, in the region of their uppermost parts. However, to increase cumulative power output under asymmetric wave entry conditions, the collector chambers are not interconnected.

The wave capture area of the open mouths 261, 267 of the collector chambers 255, 257 is bound by a first side wall 275 on the outermost side 277 of the first tubular section 259 of the first collector chamber, and a second side wall 279 on the outermost side 281 of the first tubular section 265 of the second collection chamber 257.

The side walls 275, 279 extend forwardly (i.e. towards the mouths 261, 267) from a respective point 283, 285 approximately mid-way up the length of the first tubular sections 259, 265. Each side wall terminates in a respective horizontal upper edge 287, 289 and a respective forward edge 291, 293. The forward edges 291, 293 are contiguous with respective outer edges 292, 294 of the open mouths 261, 267.

Plates 299 are provided at the lowermost parts 301, 303 of the first and second tubular sections for anchoring the structure to the sea bed 63. This is achieved by use of steel tendons embedded in the underlying seabed rock in vertical holes bored into the rock and filled with cement grout.

Thus, in use, a volume of water is partially bounded by the lowermost (lip) regions 305, 307 of the upper surfaces 309, 311 of the first tubular sections 259, 265 and the side walls 275, 279.

The apex 313 of the collector structure is flattened and, as in the structure of the first embodiment of FIG. 3, may have an inspection platform mounted thereon (not shown in FIGS. 4 and 5). A tower 317 extends upwardly from between the first tubular sections 259, 265 in the vicinity of the apex 313. A wind-powered rotor (not shown) is mounted for supplementary generation of electricity. However, the main rotor/generator equipment is mounted in respective hollow towers 319, 321 which are in communication with the hollow interiors of the respective first and second collector chambers 255, 257. These towers are arranged in pairs and are situated either side of the wind-powered rotor tower 317 extending upwardly from the flattened apex 313.

Figure 6:
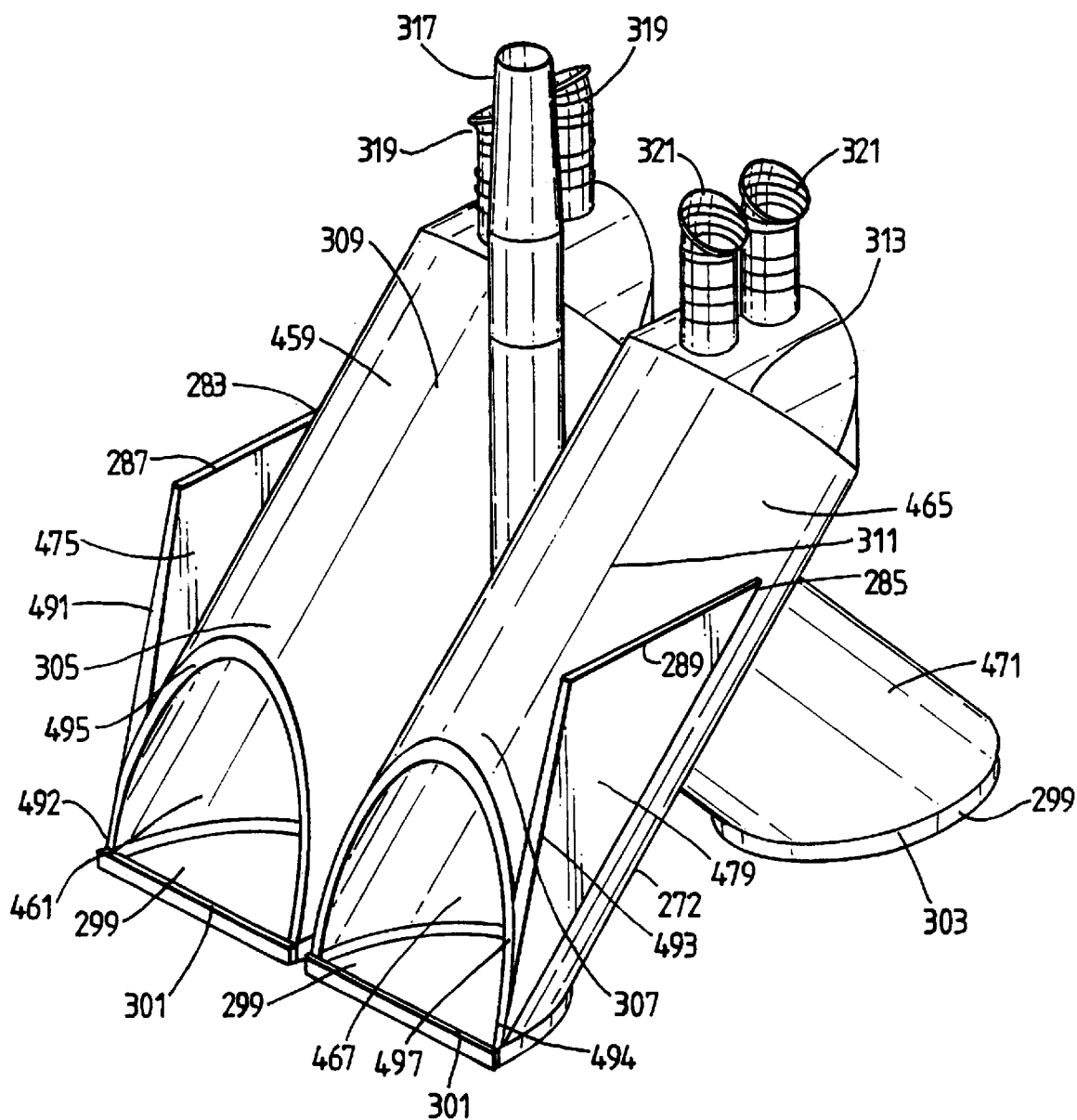
FIG. 6 shows a perspective view of a third embodiment of a wave collector structure according to the present invention.
Figure 7:
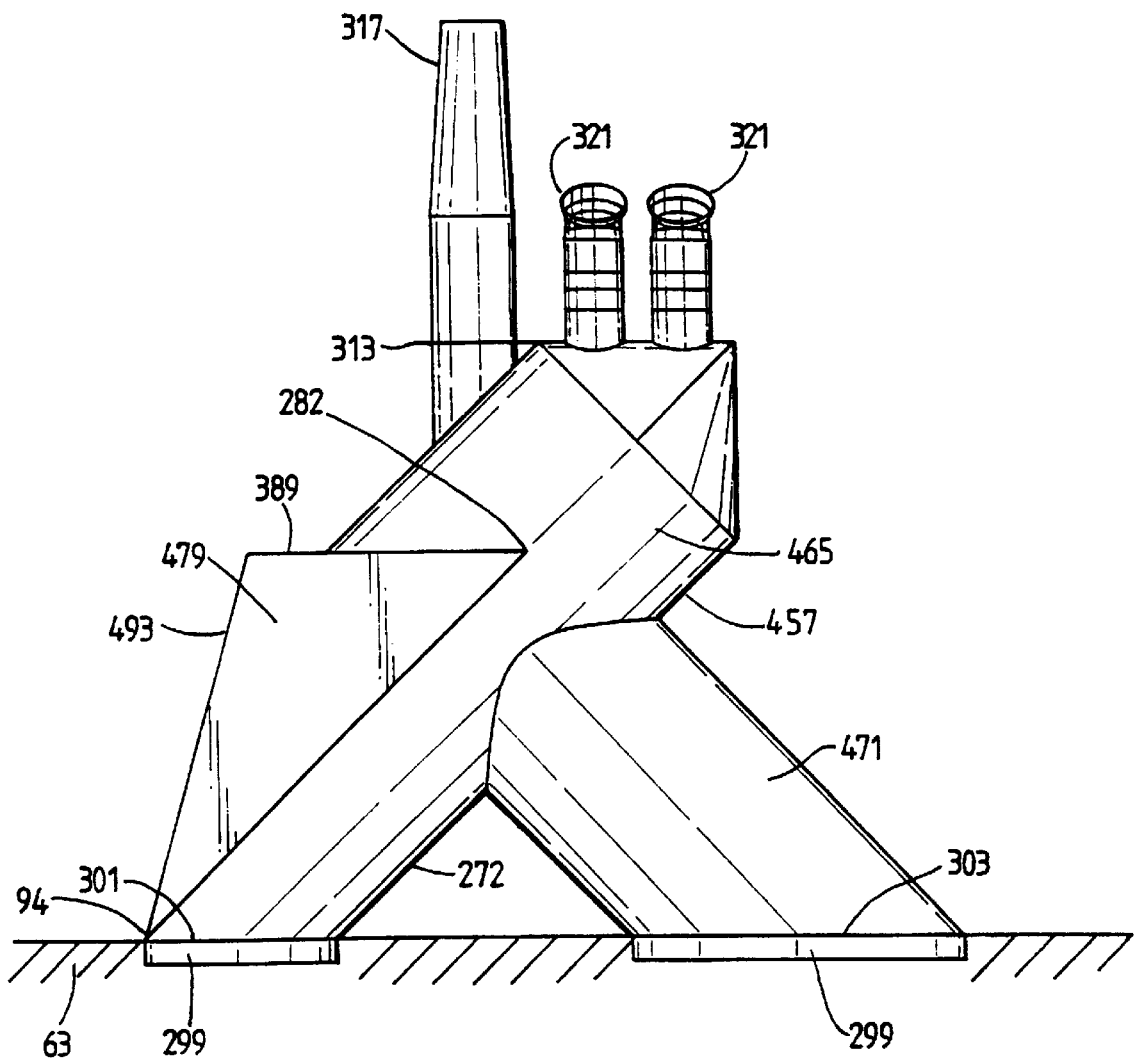
FIG. 7 shows a side view of the wave collector structure shown in FIG. 6.

A third embodiment of the present invention is shown in FIGS. 6 and 7. The wave collector structure 451 of the third embodiment is similar to that shown in FIGS. 4 and 5 expect that the first and second tubular sections are cylindrical with a generally C-shaped open mouth parts 461, 467. The side walls 475, 479 extend forwardly such that the forward edges 491, 493 extend down and are contiguous to the lowermost parts 492, 494 of the respective rims 495, 497 of the open mouth parts 461, 467.

In order to place any one of the wave collector structures of the above embodiments, the open mouth parts are closed by means of gates. These gates are not illustrated in the Figures.

This enables the complete structure to be floated to its desired location, whereupon control valves are opened to allow the ingress of water and to allow the displaced air to escape. The structure then sinks to stand on the sea bed to which it is subsequently anchored. Once the flooding operation is completed and the pressure is equalised across the gates, the gates are detached from the structure to expose the mouth parts of the structure.

In the light of this disclosure, modifications of the described embodiments, as well as other embodiments, all within the scope of the present invention as defined by the appended claims, will now become apparent to persons skilled in this art.

What is claimed is:

1. A wave collector structure for an electrical power generator powered by wave energy, comprising:
   at least one substantially tubular collector chamber, said tubular collector chamber including:
   an outwardly extending and downwardly depending lip, said lip being one of substantially curved and substantially flat in section, and
   a pair of side walls, said side walls extending horizontally substantially up to or beyond said lip,
   a base surface upon which said chamber is positioned, said tubular collector chamber being angled towards said base surface, and a lower edge which, with said lip and said side walls and said base surface, defines a mouth of said tubular collector chamber, wherein the angle of said base surface with respect to said tubular collector chamber reduces a cross-sectional area of said collector chamber toward said mouth, and wherein said side walls partially enclose a volume of water between said lip and said lower edge.

2. A structure according to claim 1, wherein the collector chambers have a rectangular cross section.

3. A structure according to claim 1, wherein the collector chambers are generally cylindrical.

4. A structure according to claim 1, wherein said base surface is a base plate attached at least partially to said lower edge of said collector chamber.

5. A structure according to claim 1, further comprising an elongate anchoring member extending downwardly therefrom for burying in the sea bed.

6. A structure according to claim 1, further comprising pipe-like members, formed with at least one of said side walls and said lip, for strengthening support.

7. A structure or collector according to claim 1, the structure being anchored to the sea bed by means of ballast or concrete inside said side walls.

8. A structure according to claim 1, further comprising an electrical generator arranged to be powered by energy derived from incident wave motion.

9. A structure according to claim 1, further comprising a wind-driven rotor for powering an auxiliary electrical power generator.

10. A wave collector structure for an electric power generator powered by wave energy according to claim 1, wherein said mouth is sealable to enable the structure to be floated to a desired location whereupon said mouth is opened to allow water to enter and allow the structure to sink.

11. A structure according to claim 10, wherein the collector mouth is sealed by removable gate means, the gate means being removed once the structure is submerged.

12. A wave collector structure according to claim 1, wherein said base surface is the sea bed.

13. A wave collector structure for an electrical power generator powered by wave energy, comprising at least one substantially tubular collector chamber, said tubular collector chamber including:

an outwardly extending and downwardly depending lip;

a pair of side walls extending horizontally substantially up to or beyond said lip;

a base plate connected to a lower edge of said lip, said tubular collector chamber being angled towards said base plate, said lip and said side walls and said base plate defining a mouth of said tubular collector chamber, wherein the angle of said base plate with respect to said tubular collector chamber reduces a cross-sectional area of said collector chamber toward said mouth, and wherein said side walls partially enclose a volume of water between said lip and said base plate.

14. A wave collector structure according to claim 13, wherein said base plate rests upon the sea bed.

15. A wave collector structure according to claim 13, wherein said mouth is sealable to enable the structure to be floated to a desired location whereupon said mouth is opened to allow water to enter and allow the structure to sink.

16. A movable wave collector structure for an electrical power generator powered by wave energy, comprising at least one substantially tubular collector chamber, said tubular collector chamber including:

an outwardly extending and downwardly depending lip;

a pair of side walls extending horizontally substantially up to or beyond said lip;

wherein said tubular collector chamber is angled towards a sea bed upon which said collector chamber is mounted, said lip and said side walls defining a mouth of said tubular collector chamber, wherein said mouth is sealable to enable the structure to be floated to a desired location whereupon said mouth is opened to allow water to enter and allow the structure to sink, and wherein said side walls partially enclose a volume of water between said lip and said sea bed when said structure has sunk.

* * * * *